United States Patent [19]

Matsumoto et al.

[11] 4,005,480
[45] Jan. 25, 1977

[54] TAPE CASSETTE AND MACHINE
[75] Inventors: Isao Matsumoto; Kenkichi Umeda, both of Tokyo, Japan
[73] Assignee: Sony Corporation, Tokyo, Japan
[22] Filed: Feb. 3, 1975
[21] Appl. No.: 546,334
[52] U.S. Cl. .............................. 360/60; 235/61.11 R
[51] Int. Cl.² .................... G11B 15/04; G06K 7/08
[58] Field of Search ............. 235/61.11 R; 242/204; 360/60, 137; 274/4 C; 346/74

[56] References Cited
UNITED STATES PATENTS

| | | | |
|---|---|---|---|
| 3,586,336 | 6/1971 | Rosenblatt | 360/60 |
| 3,702,907 | 11/1972 | Sato | 360/60 |
| 3,718,774 | 2/1973 | Kosaka | 360/60 |

Primary Examiner—Daryl W. Cook
Assistant Examiner—Robert M. Kilgore
Attorney, Agent, or Firm—Hill, Gross, Simpson, Van Santen, Steadman, Chiara & Simpson

[57] ABSTRACT

A tape cassette and machine wherein the tape cassette is provided with a breakable pin such that if the pin is removed the tape cannot be erased and wherein the machine includes a mechanism for detecting whether the pin is present in the cassette so as to properly interlock the machine to correlate with the presence or absence of the pin. As tape machines and cassettes are becoming smaller and smaller it is desirable to provide cassette mounting means and interlock mechanism which can be mounted in the minimum space.

3 Claims, 13 Drawing Figures

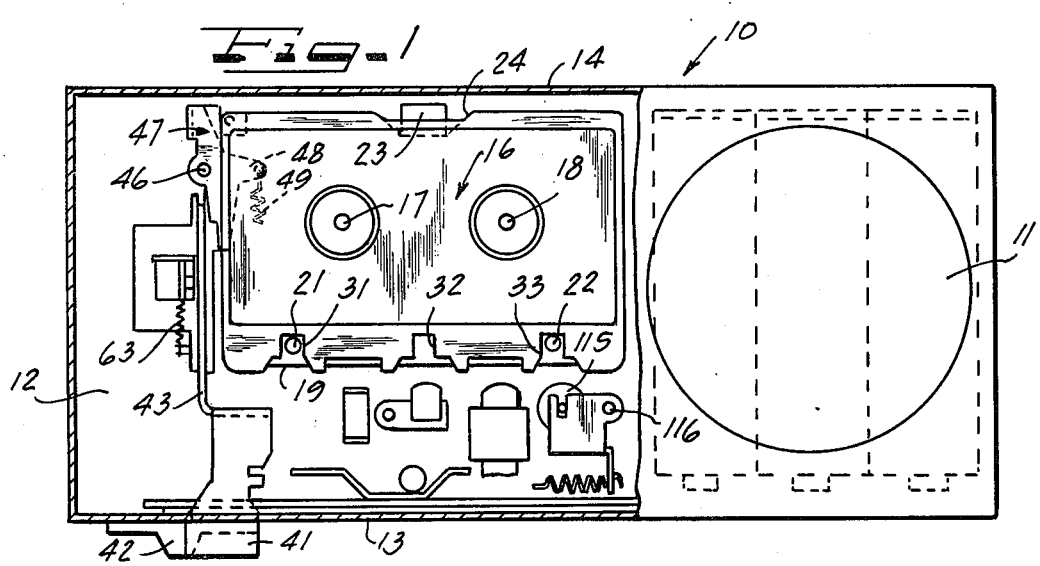
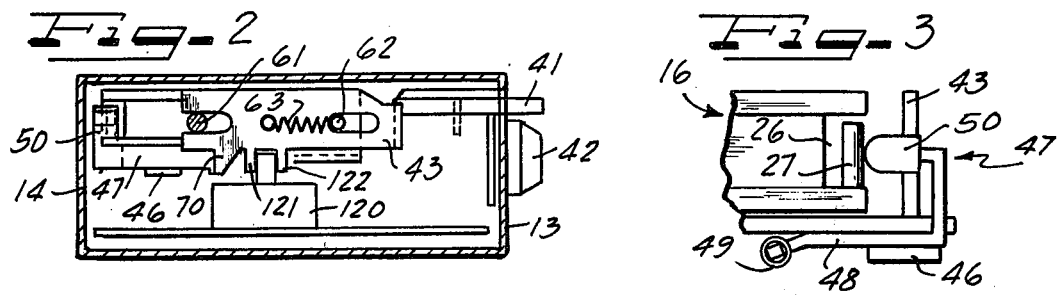
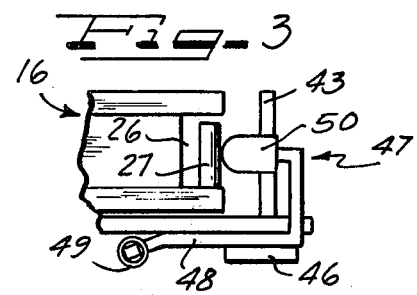
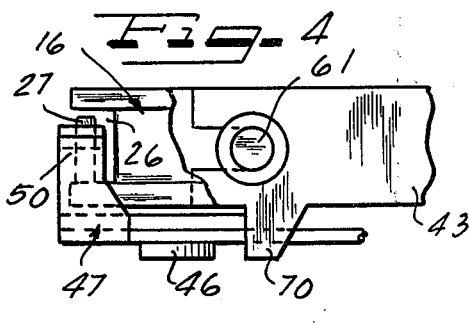
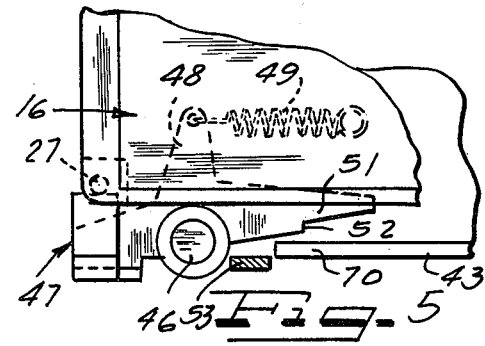
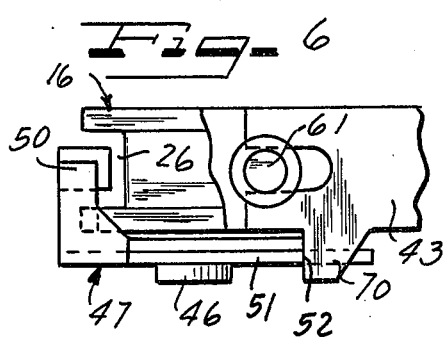
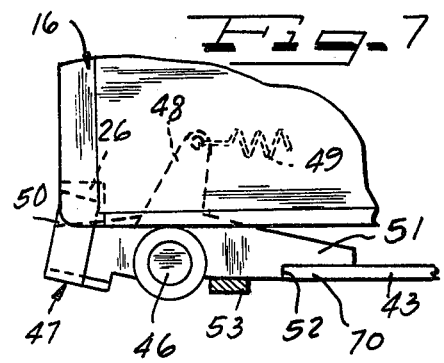

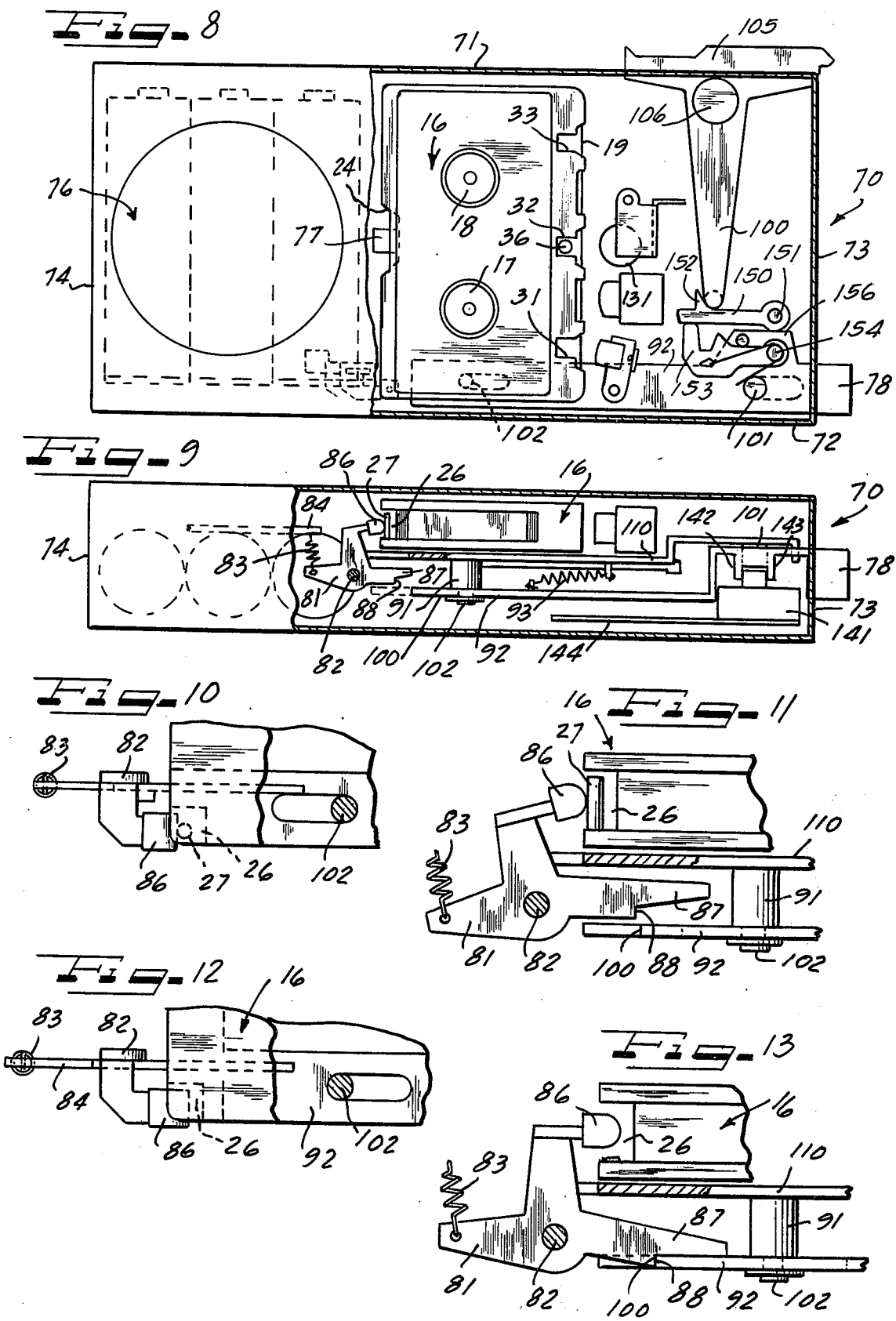

TAPE CASSETTE AND MACHINE

BACKGROUND OF THE INVENTION

1. Field of the Invention

This invention relates in general to tape cassettes and machines and in particular to a novel tape cassette and a mechanical interlock system.

2. Description of the Prior Art

Tape cassettes and machines of the prior art have provided tabs on the cassette which when removed allow an interlock mechanism to move in the recess in which the tab is mounted so as to prevent the tape from being erased. However, such tabs normally require that the interlock mechanism move in a single orientation relative to the cassette and thus the orientation of the cassette relative to the machine must remain fixed. This also limits the method and orientation of the machine and thus the minimum size of the machine is restricted with systems of the prior art.

SUMMARY OF THE INVENTION

The present invention relates to a novel tape cassette and tape machine wherein the tape cassette is provided with breakable pins engageable with a feeler mechanism in the machine such that if the breakable pin is present the feeler mechanism will move into a recess of the cassette and prevent erasure of material on the tape. In the present invention the feeler mechanism can move into the recess of the cassette from a number of different directions thus allowing tape machines of minimum size to be produced with the cassette mounted in either the longitudinal or transverse direction of the tape machine.

The feeler mechanism and interlock structure of the present invention requires minimum space and provides positive protection for the tape cassette.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a partially cut-away top view of a tape machine with a cassette mounted in the longitudinal direction of the machine.

FIG. 2 is an end view of the tape cassette of FIG. 1.

FIG. 3 is an enlarged breakaway rear view of a portion of the cassette and feeler mechanism of the apparatus of FIG. 1.

FIG. 4 is an enlarged end view of the interlock protective mechanism.

FIG. 5 is an enlarged top view of the interlock mechanism.

FIG. 6 is an enlarged end view with the feeler pin of the cassette removed.

FIG. 7 is an enlarged top view with the feeler pin removed.

FIG. 8 is a partially cut-away top sectional view of a cassette and machine with the cassette mounted transversely of the machine.

FIG. 9 is a front sectional view of the machine of FIG. 8.

FIG. 10 is an enlarged top view of the interlock mechanism with the pin of the cassette in place.

FIG. 11 is an enlarged top view with the pin of the cassette in place.

FIG. 12 is an enlarged top view with the pin of the cassette removed, and

FIG. 13 is an enlarged front view with the pin of the cassette removed.

DESCRIPTION OF THE PREFERRED EMBODIMENTS

FIG. 1 is a tape machine 10 with a portion of its top cut-away to illustrate a cassette 16 mounted longitudinally therein. The cassette 16 has a notch 24 formed in its rear edge and a spring 23 mounted in the tape machine engages the notch 24 and presses the cassette against the guide pin 21 and a capstan 22 receivable in front notches 31 and 33 formed in the front edge of the cassette. The center notch 32 is formed in the front edge of the cassette and the notches 31 and 33 are formed adjacent the ends of the cassette. The tape 19 is mounted on a pair of reels 17 and 18 rotatably supported in the cassette and moves pass the pivotally supported pinch roller 115 which is mounted on a pivot 116 so as to press the tape 119 against the capstan 22 to drive the tape. Erase heads and write heads are mounted on the machine and movable adjacent the tape 19.

The machine 10 has a speaker 11 mounted at one end thereof as shown, to reproduce the audio signal on the tape. A record push button 41 is mounted in the machine 10 and has an extension 43 formed with a pair of grooves in which guide pins 61 and 62 are mounted as shown for example in FIG. 2. A spring 63 is attached to member 43 to bias push button 41 to the right relative to FIG. 2. A feeler pawl 47 is pivotally attached to the machine by a pivot pin 46 and has a projection 48 which is attached to a spring 49 which has its other end connected to the machine so as to bias the feeler arm 47 in the clockwise direction relative to FIGS. 5 and 7 such that the feeler portion 50 of the feeler pawl 47 engages the pin 27 mounted in the opening 26 of the cassette 16. The pins 27 and openings 26 are formed in both rear corners of the cassette 16 such that a feeler means can engage the pin 27 and move into the opening 26 over a 90° angle sector. If the pin 27 in the rear left hand corner of the cassette relative to FIG. 1 is still in place, the feeler mechanism 50 engages it and holds the feeler arm 47 in the position shown in FIG. 5 such that a notch 52 formed in the end 51 of the feeler arm 47 will not block the cam portion 70 of the arm 43. This allows the push button 41 to be depressed and the extension 43 to move to the left relative to FIG. 2 and the switch actuator arms 121 and 122 which are attached to extension 43 can engage the switch actuator button of switch 120 so as to energize the erase function of the tape machine.

Thus, whether the tape machine 10 can be placed in the erase mode depends on whether the pin 27 has been removed. If the pin is in place as shown in FIGS. 3, 4 and 5 for example, the feeler arm 47 will be held in the position shown in FIGS. 3, 4 and 5 due to the fact that the engaging portion 50 of the feeler arm engages the pin 27 and the notch 52 of the end 51 of the feeler arm will not engage the extension 70 of the arm 43 such that the arm 43 can move to the left relative to FIGS. 2 and 5 and the switch 120 can be energized so as to enable the erase function.

On the other hand, if the pin has been removed by breaking the pin 27 the feeler arm 47 will move clockwise relative to FIG. 7 due to the action of the spring 49 thus moving the feeler arm portion 51 against a stop 53 wherein the notch 52 of the arm 47 engages the extension 70 of the extension 43 as shown in FIG. 6. Thus, in the condition of FIGS. 6 and 7 the switch actuators 121 and 122 will not close switch 120 so as to enable the erase function of the tape machine 10 and erasure of the tape 19 will not occur in the machine.

It is to be particularly noted that in the machine illustrated in FIGS. 1 through 7 that the feeler arm 47 moves into the recess 26 from the end of the cassette because the recess 26 is available over a 90° sector. This is significant because this allows the tape machine 10 to be made as small as possible in that the feeler arm 47 can be mounted as shown and need not be mounted behind the cassette between the rear edge of the cassette and wall 14 of the machine which would require that the tape machine 10 be larger than necessary. In other words, the provision that the slot 26 is available over a 90° sector allows the feeler arm 47 to be mounted such that it moves into the slot from either the side or the rear of the cassette or at any intermediate position.

The modification of the invention is illustrated in FIG. 8 wherein the tape machine 70 is designed so as to receive the cassette 16 in the transverse position such that a spring 77 is received in the recess 24 and a capstan 36 is received in center opening 32 of the cassette. The pinch roller 131 is movable to press the tape 19 against the capstan 36. Speaker 76 is mounted adjacent the end 74 of the machine 70 and an erase button 78 is slidably mounted in the machine and extends through the end wall 73. A pair of guide pins 101 and 102 slidably support the extension arm 92 of the erase button 78 as shown. A notch 100 is formed adjacent the end of the extension arm 92. The extension 92 has switch actuators 142 and 143 which are engageable with the actuating button of an erase switch 141 which is mounted on a frame member 144 of the machine. The standoff 91 extends from a frame member 110 of the machine and carries the guide pin 102 as shown in FIGS. 9, 11 and 13. A feeler pawl 81 is supported by pivot pin 82 and is spring biased by a spring 83 in the clockwise direction relative to FIG. 11 and urges a follower 86 against the pin 27 in the recess 26 of the cassette 16.

If the pin 27 is present in the recess 26 erasure can occur because the erase button 78 can be depressed because as shown in FIGS. 10 and 11 the member 81 has an extending portion 87 with a notch 88 which will not engage the notch 100 of the extension 92 due to the fact that the feeler 86 engages the pin 27 and the extension 92 can slide pass the notch 88 of the member 81.

On the other hand, if the pin 27 has been removed the member 81 will rotate clockwise relative to its position shown in FIG. 11 to the position shown in FIG. 13 and 12 such that the notch 88 of the member 81 is aligned with and engages the notch 100 in the extension 92 thus preventing the extension 92 from being moved to the left relative to FIG. 13 to a position sufficient to energize the erase enable switch 141. A spring 93 biases the extension 92 to the right relative to FIG. 9 so that it will return.

It is to be realized, of course, that suitable erase write, and reproduce heads are mounted adjacent the tapes in both machines to accomplish the erase, write and reproduce functions as desired.

As shown in FIG. 8, a control lever 100 is pivotally mounted on the pivot pivot 106 and has a control portion 105 which when moved in counter-clockwise direction stops the machine and when moved in the clockwise direction provides for forward drive of the tape.

When the erase button 78 is pushed to the right relative to FIG. 8 it carries the spring biased pawl 153 which is supported by pivot pin 154 mounted on portion 156 of member 92. This allows the pawl 150 to be moved downwardly by member 100 which engages extension 152 of pawl 150 such that the end of member 153 is held by the end of pawl 150 in the locked position.

When the member 100 is moved counter clockwise the end of member 100 allows member 150 to move up due to a spring bias so that it clears the end of member 153 and actuator extension 92 and erase button can move to the far right position.

It is seen that this invention has been described with respect to preferred embodiments although it is not to be so limited as changes and modification may be made therein which are in the full intended scope as defined by the appended claims.

We claim as our invention:

1. A tape machine for a tape cassette having recesses formed therein and selectively removable pins mounted in said recesses for preventing erasure of the tape cassette when said pins have been removed and to allow erasure of the tape cassette when said pins have not been removed, comprising an erase member slidably mounted on said tape machine, a manually operable push button mounted on one end of said slidable erase member, a pawl pivotally mounted on said tape machine and having a cassette engaging portion formed thereon and said pawl spring biased such that said cassette engaging portion is biased toward one of said pins and movable into one of said recesses, a notch formed in said pawl and said slidable erase member engageable with said pawl such that if one of said removable pins has been removed said slidable erase member engages said notch in said pawl to prevent substantial movement of said erase member and prevent erasure, and an erase enable switch directly engageable with said slidable erase member such that said slidable erase member actuates said switch when said erase enable switch is moved when said one of said pins has not been removed.

2. A tape machine according to claim 1 wherein said pawl is pivotally mounted on said tape machine on a shaft which extends parallel to said removable pins.

3. A tape machine according to claim 1 wherein said pawl is pivotally supported on a shaft which extends at right angles to said pins.

* * * * *